(12) United States Patent
Bennett (10) Patent No.: US 7,215,382 B2
(45) Date of Patent: May 8, 2007

(54) METHOD AND APPARATUS FOR PROVIDING STATUS IN DIGITAL TELEVISION CHANNELS

(75) Inventor: William G. Bennett, Vista, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 480 days.

(21) Appl. No.: 10/690,429

(22) Filed: Oct. 21, 2003

(65) Prior Publication Data

US 2004/0145680 A1 Jul. 29, 2004

Related U.S. Application Data

(60) Provisional application No. 60/442,279, filed on Jan. 24, 2003.

(51) Int. Cl.
*H04N 5/50* (2006.01)
*H04N 5/445* (2006.01)
*H04N 7/20* (2006.01)

(52) U.S. Cl. .................... 348/570; 348/731; 725/37

(58) Field of Classification Search ............... 348/570, 348/731, 732, 735, 569, 184; 725/37, 38, 725/68, 70, 72; 714/47, 712; 455/154.1, 455/161.3, 245.1, 234.1, 234.2; 375/228; 370/252

See application file for complete search history.

(56) References Cited

U.S. PATENT DOCUMENTS

| | | | |
|---|---|---|---|
| 5,574,509 A * | 11/1996 | Citta et al. .................. | 348/569 |
| 5,966,186 A * | 10/1999 | Shigihara et al. ........... | 348/570 |
| 6,389,070 B1 * | 5/2002 | Cugnini et al. ............. | 375/232 |
| 6,985,190 B1 * | 1/2006 | Klopfenstein et al. ...... | 348/569 |

* cited by examiner

*Primary Examiner*—Victor R. Kostak
(74) *Attorney, Agent, or Firm*—Mayer & Williams PC; Karin L. Williams, Esq.

(57) ABSTRACT

A method for displaying a status to a television viewer provides detailed information to a viewer. According to the method, signal strength of a received RF signal is evaluated, and an RF signal strength indicator value is created. The RF signal strength indicator value can be a qualitative indicator, such as strong, good, normal, weak, or absent. The RF signal indicator value can also be a quantitative value. A transport signal is also evaluated and a transport signal validity indicator value is then created. A quantitative value could be obtained based on the bit error rate, for example. Additionally, received parsing information is evaluated and a parsing validity indicator value is created. As with the transport signal, the received parsing information can be evaluated to obtain a qualitative indicator, such as valid or invalid. The RF signal strength indicator value, the transport signal validity indicator value and the parsing validity indicator value are displayed automatically if television programming is not being displayed or detected when programming a channel map or under control of a user. So, if the programming fails to display or be detected, these status values are displayed in place of a blank screen.

15 Claims, 5 Drawing Sheets

FIG 4

Television display- one channel in sequence of channels checked

```
Scanning Ant Ch 22
      found
Scanning Cable Ch. 22
      found
Scanning Ant Digital Ch 22
      Not found
   Scanning cable digital Ch 22
      found
```

FIG 5

Television display- one channel in sequence of channels checked

```
Scanning Ant Ch 22
      found
Scanning Cable Ch. 22
      found
Scanning Ant Digital Ch 22
      Signal    XXX
      Parsing   YYY
   Transport  ZZZ
   Scanning cable digital Ch 22
      Signal    XXX
      Parsing   YYY
      Transport  ZZZ
```

FIG 6

Television display- Tuned to a channel that is no longer available

```
Cable Digital Ch 22
    Signal     XXX
    Parsing    YYY
    Transport  ZZZ
    Other
```

EXAMPLE

STRONG, GOOD, BAD, NOT AVAILABLE
GOOD, BAD, MISSING,
OOD, BAD, MISSING
  # video streams, # audio stream, audio only,
  Video only, Scrambled, data, etc.

METHOD AND APPARATUS FOR PROVIDING STATUS IN DIGITAL TELEVISION CHANNELS

STATEMENT OF RELATED APPLICATION

This application claims the benefit of priority to U.S. Provisional Patent Application 60/442,279, filed Jan. 24, 2003 by the same inventor, and entitled "Pre-setable Audio Gain Setting To Compensate For Program Source Head Room Volume."

FIELD OF THE INVENTION

The present invention relates generally to methods and apparatuses for receiving digital television signals, and more particular to a method and apparatus for receiving a digital television signal that is being broadcast to the public, such a digital cable, satellite and digital terrestrial television.

BACKGROUND

High Definition Digital Television is now being increasingly broadcast throughout the country. Many users have complicated digital receivers and set-top boxes arranged in a variety of ways to receive both digital and analog television, as well as High Definition Television (HDTV). Each system can require different troubleshooting techniques.

In analog television, when a problem arises the picture typically degrades in a way that the user understands. For example, the picture may become fuzzy, or lose horizontal synchronization, to name only a few. This poor picture, however, provided the viewer with some information as to the source of the problem, thereby enabling the viewer to attempt a correction on his own, often with at least some limited success.

However, when a digital television channel degrades or is broken at the source for one of several possible reasons, the picture simply fails to display leaving the viewer with blank screen; hence the viewer has no idea as to why the channel is not being displayed. Digital television reception failure can occur for many reasons, each of which requires a different solution. A digital receiver performs several steps to recreate the program being transmitted, such as RF conversion, transport recovery and packet decoding. A failure in any one of these steps will result in a blank screen. Yet the solution for each of these steps can be significantly different. Moreover, the process is generally a non-linear process, so that making a change in the wrong part of the process can lead to more problems, thereby making it difficult to return to the initial state.

The present invention is therefore directed to the problem of developing a method and apparatus for enabling a user to understand why a digital television channel is not being displayed.

SUMMARY OF THE INVENTION

The present invention solves these and other problems by automatically providing a status signal to the user when a selected program is not detected or displayed. This status signal provides information as to the point in the digital process that the failure occurred, thereby enabling more rapid corrective action or understanding of the problem.

According to one aspect of the present invention, a method for displaying a status to a television viewer includes creating a digital television signal status value indicative of one or more parameters of a received digital signal, and displaying automatically the digital television signal status value if television programming is not being displayed or detected when programming the channel map. The digital television signal status value can includes a value indicative of a received RF signal strength, a value indicative of a transport signal validity, or a value indicative of trying the validity of the parsing information that could be contained in the Pat, Pmt, PSIP or other tables used for decoding digital signals.

According to another aspect of the present invention, an exemplary embodiment of a method for providing a status signal to the user automatically displays an RF signal strength value, a transport validity indicator and a parsing table validity indicator for a selected channel on the screen when a program is not being displayed on the selected channel or detected when programming the channel map. Each of these indicators provides the viewer with an indication as to the source of the problem. These indicators can be either qualitative or quantitative or both. For example, the RF signal strength could be labeled strong along with a specified value.

According to another aspect of the present invention, an exemplary embodiment of an apparatus for displaying a status to a user when digital programming is not being displayed or detected when programming the channel map includes an RF receiver, a transport demultiplexer and a decoder. The RF receiver converts an RF signal to a digital bit stream. The RF receiver also includes a software module that evaluates signal strength of a received RF signal and outputs an RF signal strength indicator value that is automatically displayed if television programming is not being displayed or detected when programming the channel map. The transport demultiplexer converts the digital bit stream into its constituent packets. The transport demultiplexer also includes a software module that evaluates a transport signal and provides a transport signal validity indicator value that is automatically displayed if television programming is not being displayed or detected when programming the channel map. The decoder converts the packets into a television signal. The decoder also includes a software module that tries the received parsing information and provides a parsing validity indicator value that is automatically displayed if television programming is not being displayed or detected when programming the channel map. The RF signal strength indicator value can either be a quantitative indicator or a qualitative indicator. The transport signal indicator value can be a qualitative indicator or a quantitative indicator. The parsing indicator value can also be a qualitative indicator or a quantitative indicator.

Other aspects of the present invention will be apparent upon review of the detailed description in light of the following drawings.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
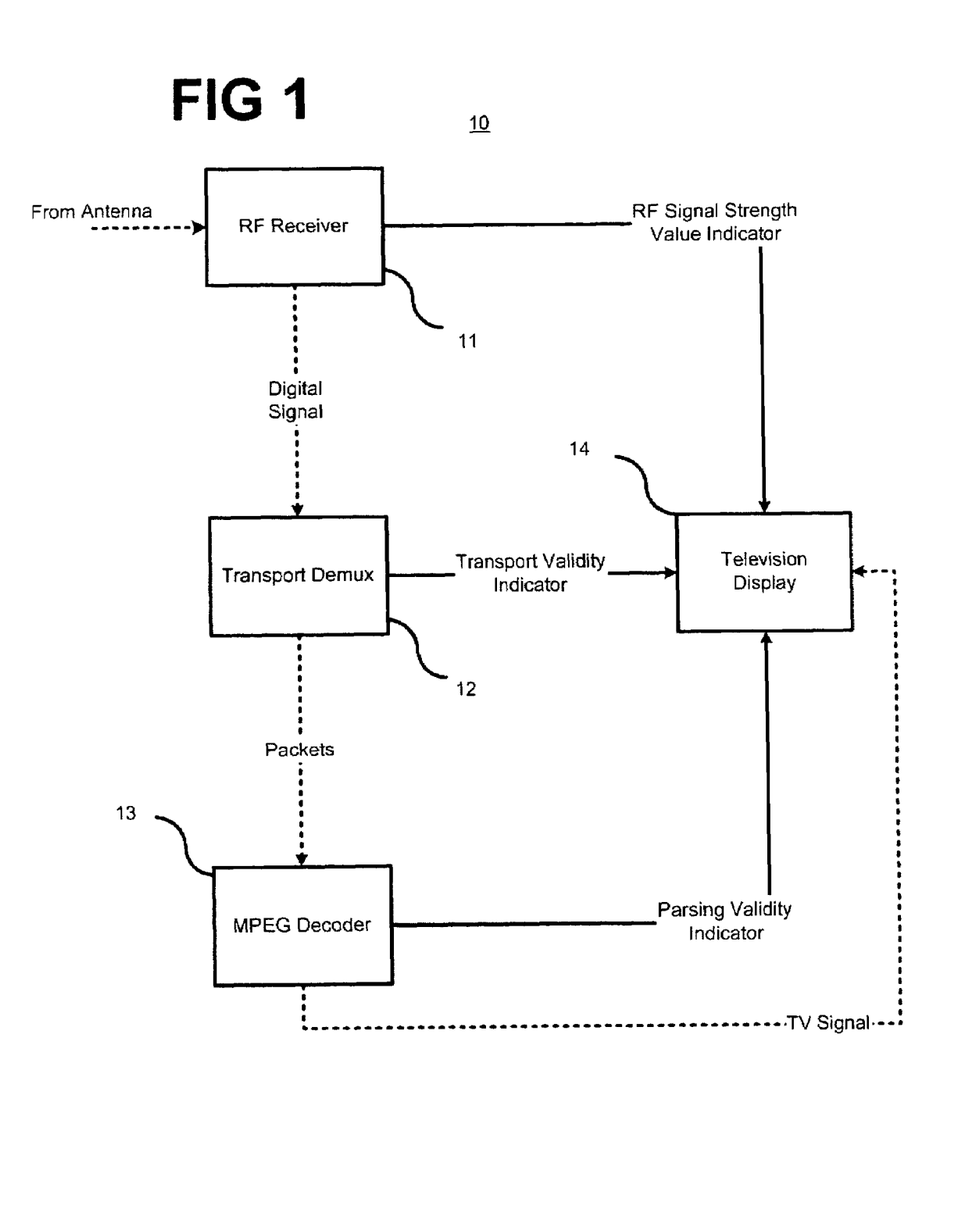
FIG. 1 depicts a block diagram of an exemplary embodiment of an apparatus for providing a status to a user according to one aspect of the present invention.

FIG. 1 shows an exemplary embodiment of an apparatus 10 for displaying a status to a user when digital programming is not being displayed on the television 14 or if the programming is not detected when programming the channel map. The signal arrives from the antenna or other signal source.

The signal being output from the antenna or some other signal source, such as a cable television head-end, or a broadcast receiving antenna, is an RF signal. An RF receiver 11 converts the RF signal to a digital bit stream. The RF receiver 11 is a standard RF receiver with a software module that evaluates the signal strength of the received RF signal and provides an RF signal strength indicator value that is sent to the television 14 and is automatically displayed if the television programming is not being displayed or detected when programming the channel map. While FIG. 1 shows the status signal being sent directly to the television, in fact, this signal may be actually sent to a different unit that creates the television picture from either the selected programming or the different status signals discussed here and below.

A transport demultiplexer 11 converts the digital bit stream into its constituent packets. The transport demultiplexer 12 is a standard transport demultiplexer with a software module that evaluates the transport signal and provides a transport signal validity indicator value that is sent to the television 14 and is automatically displayed if the television programming is not being displayed or detected when programming the channel map. As with the RF signal strength status signal, while FIG. 1 shows the transport status signal being sent directly to the television, in fact, the transport status signal may be actually sent to a different unit that creates the television picture from either the selected programming or the several status signals.

An MPEG decoder 13 converts the packets into a television signal. The MPEG decoder is a standard MPEG decoder with a software module that evaluates the parsing information and provides a parsing validity indicator value that is sent to the television 14 and is automatically displayed if the television programming is not being displayed or detected when programming the channel map. As with the RF signal strength status signal and the transport status signal, while FIG. 1 shows the parsing status signal being sent directly to the television, in fact, the parsing status signal may be actually sent to a different unit that creates the television picture from either the selected programming or the several status signals. While an MPEG decoder is shown, other decoders that convert the received packets into television signals can be used, depending upon the format of the received packets.

Figure 2:
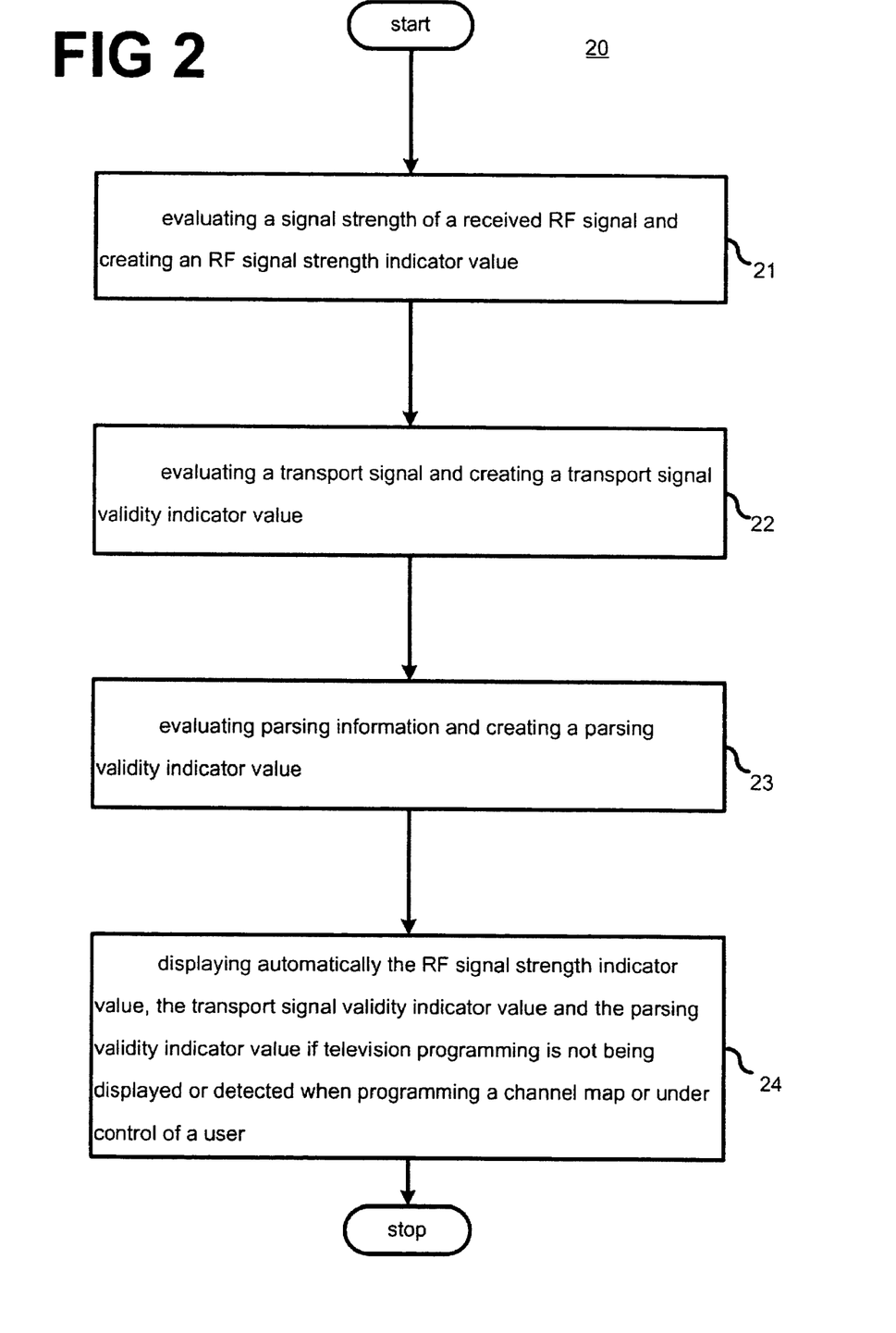
FIG. 2 depicts a flow chart of a method for providing a status to a user according to another aspect of the present invention.

Turning to FIG. 2, shown therein is a method 20 for displaying a status to a television viewer. According to the method, signal strength of a received RF signal is evaluated, and an RF signal strength indicator value is created (element 21). The RF signal strength can be easily determined in the RF receiver by, for example, examining the amplitude of the signal, phase lock status, error rate, and equalizer coefficients. Other ways are also possible. The RF signal strength indicator value can be a qualitative indicator, such as strong, good, normal, weak, or absent. The RF signal strength indicator value can also be a qualitative value, such as a dBm (decibels relative to a milliwatt) value, a value on a scale of 1 to 100 or 1 to 10, a percentage of acceptable signal level, etc. In fact, the RF signal strength status signal can be a combination of a qualitative indicator and a quantitative indicator, such as strong (80%). This would provide information for both the novice and the advanced viewers.

A transport signal is also evaluated and a transport signal validity indicator value is then created (element 22). The transport signal can be evaluated based on timing information, framing information, bit error rate, etc. to determine a qualitative value, such as valid or invalid. A quantitative value could be obtained based on the bit error rate, for example. As with the RF signal strength status signal, the transport status signal can be a combination of a qualitative indicator and a quantitative indicator, such as valid (BER=$10^{-8}$). The quantitative indicator could also signify that there are a certain number of digital streams within the transport signal.

Additionally, parsing information is evaluated and a parsing validity indicator value is created (element 23). The received parsing information is the key to decoding the packets in the MPEG decoder. Without this key, the MPEG decoder cannot recreate the transmitted signal. As with the transport signal, the parsing information can be evaluated to obtain a qualitative indicator, such as valid or invalid, or a quantitative indicator. For example, the parsing status could be valid (1. Video Ch, 3. Audio ch). Other information could be included as well, such as that the contents are scrambled.

The RF signal strength indicator value, the transport signal validity indicator value and the parsing validity indicator value are then displayed automatically if television programming is not being displayed or detected when programming a channel map or under control of a user (element 24). So, if the programming fails to display, these status values can be displayed in place of a blank screen.

Figure 3:
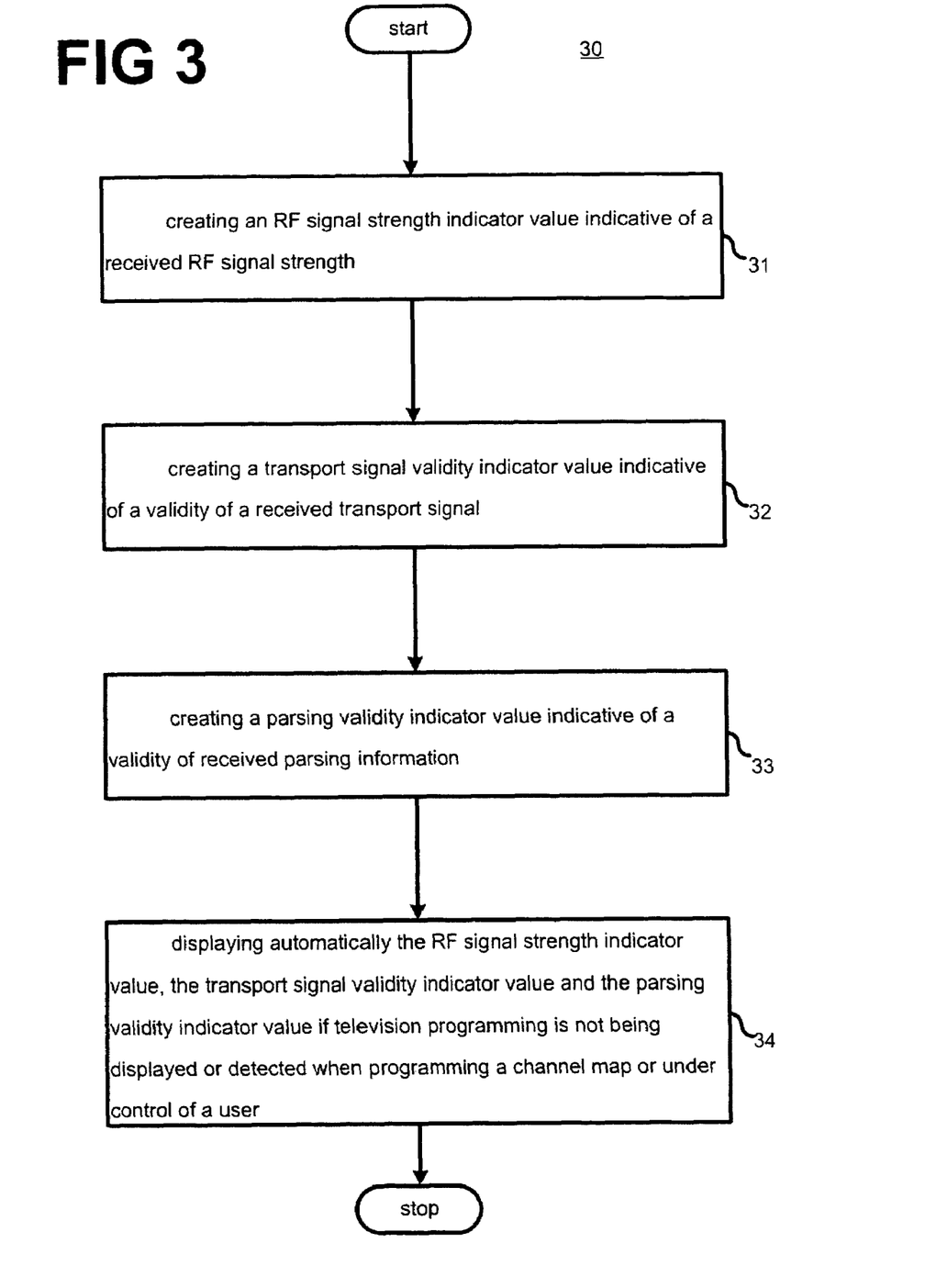
FIG. 3 depicts a flow chart of a method for providing a status to a user according to yet another aspect of the present invention.

Turning to FIG. 3, shown therein is another exemplary embodiment of a method for displaying a status to a television viewer. According to this method, an RF signal strength indicator value is created that is indicative of a received RF signal strength (element 31). As in the above method, this value can be a qualitative or quantitative value or a combination of the two.

Additionally, a transport signal validity indicator value is created that is indicative of a validity of a received transport signal (element 32). This is most likely a qualitative value indicating a valid transport signal or an invalid transport signal, although it could also be a quantitative value, or a combination of the two.

A parsing validity indicator value is also created that is indicative of a validity of received parsing information (element 33). This is also most likely a qualitative value indicating valid parsing information or invalid parsing information, although it could also be a quantitative value, or a combination of the two.

The RF signal strength indicator value, the transport signal validity indicator value and the parsing validity indicator value are displayed if television programming is not being displayed or detected when programming the channel map or under control of a user (element 34). Some or all of these values can be displayed. Additional values may also be displayed. As the user tunes to a different channel, the values associated with the tuned channel are displayed.

Moreover, these values could be displayed at the initiation of the viewer. For example, by pressing a channel status button, the screen could display the current status of the currently selected channel, or the status of all channels.

Figure 4:
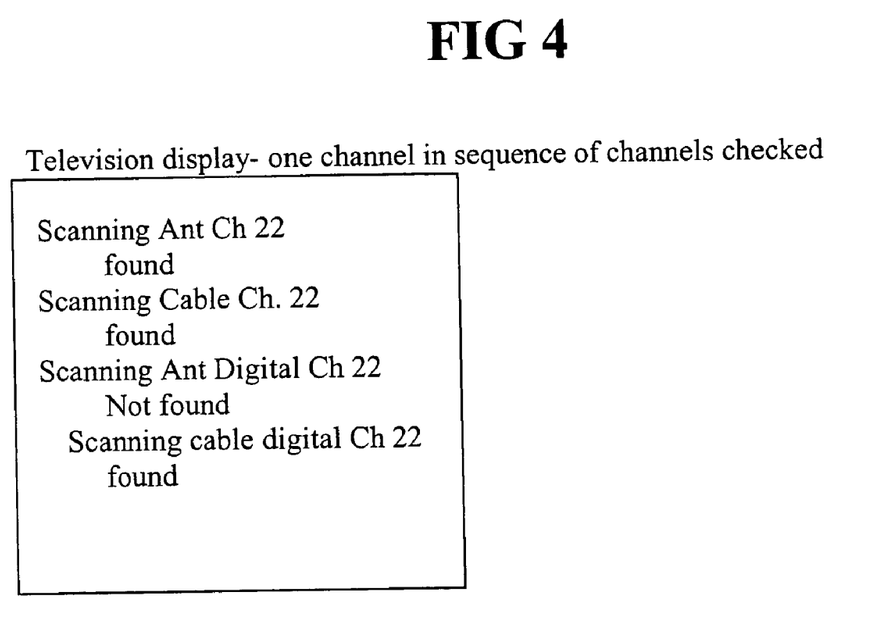
FIG. 4 depicts a conventional display of a channel status.

FIG. 4 depicts a typical display 40 of a television or set-top box that is scanning the available channels to place them into the available channel table. This shows that no signal was found on the antenna (ANT Digital) for channel 22; however, a signal was found on cable channel 22, as well as antenna channel 22. Unfortunately, this display provides little information to a use about the lack of a signal on antenna Digital channel 22.

Figure 5:
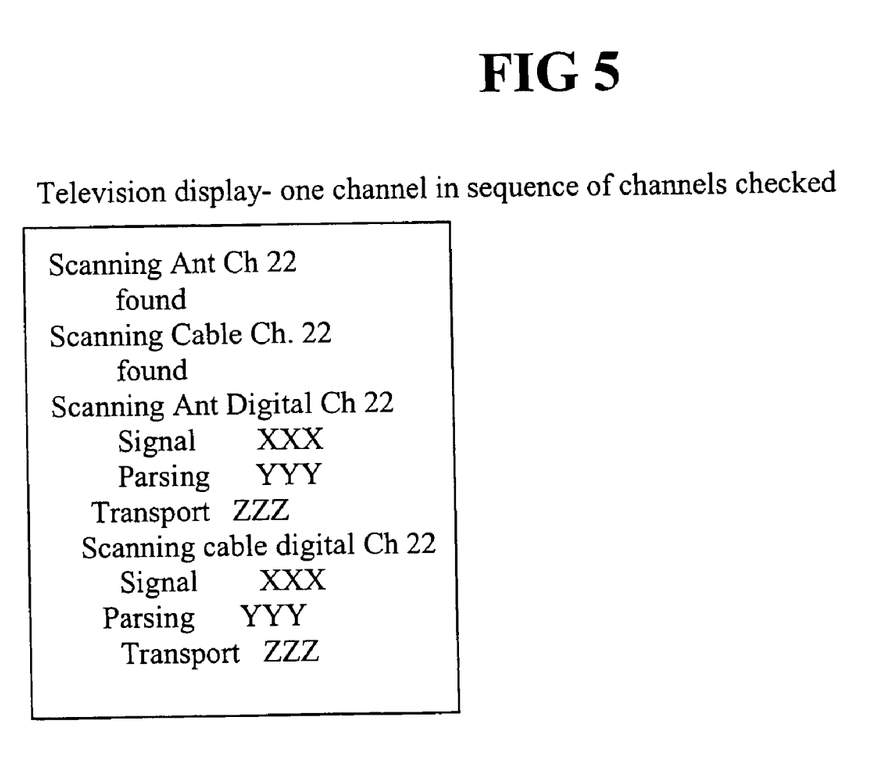
FIG. 5 depicts a display of a channel status according to yet another aspect of the present invention.

FIG. 5 depicts a display 50 of a television set-top box that is scanning the available channels to place them into the available channel table. In this case, only one channel is displayed for simplicity purposes, however, a similar display would be shown for each channel scanned. FIG. 5 shows that no signal was found on the antenna (ANT Digital) for channel 22; however, a signal was found on cable channel 22, as well as antenna channel 22. In addition, a status of the signal is indicated. The RF Signal is "xxx" which stands for either good, fair or bad (or some other relative qualifier) or a quantitative signal value, such as 32. Moreover, the parsing information is indicated as either "yyy", which represents valid or invalid (or some other similar qualifier). In addition, the transport signal is shown as "zzz", which represents valid or invalid or some other qualifier. An option to add the channel may be offered if an RF signal is bad or if the parsing information is invalid or the transport is invalid.

A similar display would be shown in the case of an all channel scan add function that would be used to scan all available channels and add those found, such as would be performed in a system initialization.

If in the process of scanning a bad signal or a channel with invalid parsing information, the user can be prompted to add the found channel anyway. This could be useful if the user knew the channel signal might improve or if the parsing information might become valid at a later time.

Figure 6:
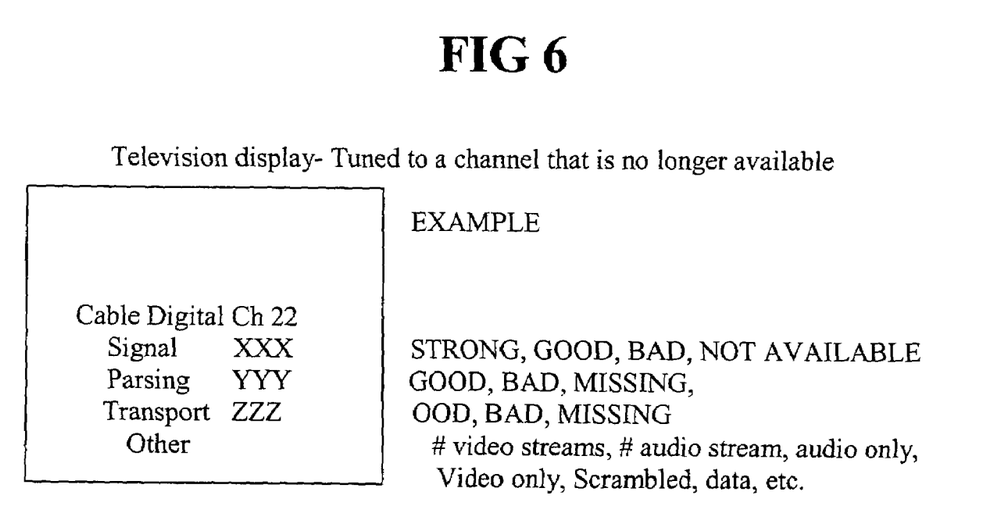
FIG. 6 depicts a display of a channel status for a channel currently not available according to still another aspect of the present invention.

FIG. 6 depicts a display XX of a television set-top box that was tuned to a channel that was no longer available. Rather than displaying a blank screen or a simple display that there is no signal, the display can provide a quantitative or qualitative status of the signal being received, even if not being displayed.

Although various embodiments are specifically illustrated and described herein, it will be appreciated that modifications and variations of the invention are covered by the above teachings and are within the purview of the appended claims without departing from the spirit and intended scope of the invention. For example, certain status messages are discussed, however, others could be employed. Furthermore, this example should not be interpreted to limit any modifications and variations of the invention that are covered by the claims but is merely illustrative of one possible variation.

What is claimed is:

1. An apparatus for displaying a status to a user when digital programming is not being displayed or detected when programming a channel map comprising:
   an RF receiver to convert an RF signal to a digital bit stream, said RF receiver including a software module that evaluates a signal strength of a received RF signal and outputs an RF signal strength indicator value that is automatically displayed if television programming is not being displayed or detected when programming the channel map or under control of a user;
   a transport demultiplexer to convert the digital bit stream into its constituent packets, said transport demultiplexer including a software module that evaluates a transport signal and provides a transport signal validity indicator value that is automatically displayed if television programming is not being displayed or detected when programming the channel map or under control of a user; and
   a decoder to convert the packets into a television signal, said decoder including a software module that evaluates a parsing information and provides a parsing validity indicator value that is automatically displayed if television programming is not being displayed or detected when programming the channel map or under control of a user.

2. The apparatus according to claim 1, wherein the RF signal strength indicator value comprises a quantitative indicator.

3. The apparatus according to claim 1, wherein the RF signal strength indicator value comprises a qualitative indicator.

4. The apparatus according to claim 1, wherein the transport signal indicator value comprises a qualitative indicator.

5. The apparatus according to claim 1, wherein the transport signal indicator value comprises a quantitative indicator.

6. The apparatus according to claim 1, wherein the parsing indicator value comprises a qualitative indicator.

7. The apparatus according to claim 1, wherein the parsing indicator value comprises a quantitative indicator.

8. A method for displaying a status to a television viewer comprising:
   evaluating a signal strength of a received RF signal and creating an RF signal strength indicator value;
   evaluating a transport signal and creating a transport signal validity indicator value;
   evaluating the parsing information and creating a parsing validity indicator value; and
   displaying automatically the RF signal strength indicator value, the transport signal validity indicator value and the parsing validity indicator value if television programming is not being displayed or detected when programming a channel map or under control of a user.

9. The method according to claim 8, wherein the RF signal strength indicator value comprises a quantitative indicator.

10. The method according to claim 8, wherein the RF signal strength indicator value comprises a qualitative indicator.

11. The method according to claim 8, wherein the transport signal indicator value comprises a qualitative indicator.

12. The method according to claim 8, wherein the transport signal indicator value comprises a quantitative indicator.

13. The method according to claim 8, wherein the parsing indicator value comprises a qualitative indicator.

14. The method according to claim 8, wherein the parsing indicator value comprises a quantitative indicator.

15. A method for displaying a status to a television viewer comprising:
   creating an RF signal strength indicator value indicative of a received RF signal strength;
   creating a transport signal validity indicator value indicative of a validity of a received transport signal;

creating a parsing validity indicator value indicative of a validity of received parsing information; and displaying automatically the RF signal strength indicator value, the transport signal validity indicator value and the parsing validity indicator value if television programming is not being displayed or detected when programming a channel map or under control of a user.

* * * * *

UNITED STATES PATENT AND TRADEMARK OFFICE
CERTIFICATE OF CORRECTION

PATENT NO. : 7,215,382 B2 Page 1 of 1
APPLICATION NO. : 10/690429
DATED : May 8, 2007
INVENTOR(S) : William G. Bennett It is certified that error appears in the above-identified patent and that said Letters Patent is hereby corrected as shown below:

Col. 1, Line 19, before "digital", change "a" to -- as --.
Col. 1, Line 33, after "however", change "provided" to -- provides --.
Col. 1, Line 39, before "blank", insert -- a --.
Col. 2, Line 5, after "can", change "includes" to -- include --.
Col. 3, Line 33, after "may", change "be actually" to -- actually be --.
Col. 3, Line 46, after "may", change "be actually" to -- actually be --.
Col. 3, Line 59, after "may", change "be actually" to -- actually be --.
Col. 4, Line 8, before "value" (second occurrence), change "qualitative" to -- quantitative --.
Col. 5, Line 15, before "about", change "use" to -- user --.

Signed and Sealed this

Twenty-seventh Day of November, 2007

JON W. DUDAS
*Director of the United States Patent and Trademark Office*